United States Patent
Lesartre et al.

(10) Patent No.: US 11,221,967 B2
(45) Date of Patent: Jan. 11, 2022

(54) SPLIT MODE ADDRESSING A PERSISTENT MEMORY

(71) Applicant: HEWLETT PACKARD ENTERPRISE DEVELOPMENT LP, Houston, TX (US)

(72) Inventors: Gregg B. Lesartre, Fort Collins, CO (US); Blaine D. Gaither, Fort Collins, CO (US); Dale C. Morris, Steamboat Springs, CO (US); Carey Huscroft, Davis, CA (US); Russ W. Herrell, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 525 days.

(21) Appl. No.: 14/780,392

(22) PCT Filed: Mar. 28, 2013

(86) PCT No.: PCT/US2013/034385
§ 371 (c)(1),
(2) Date: Sep. 25, 2015

(87) PCT Pub. No.: WO2014/158167
PCT Pub. Date: Oct. 2, 2014

(65) Prior Publication Data
US 2016/0041928 A1 Feb. 11, 2016

(51) Int. Cl.
*G06F 12/08* (2016.01)
*G06F 12/0808* (2016.01)
(Continued)

(52) U.S. Cl.
CPC ...... *G06F 12/1408* (2013.01); *G06F 12/0246* (2013.01); *G06F 12/1483* (2013.01);
(Continued)

(58) Field of Classification Search
CPC .. G06F 12/1408; G06F 12/0246; G06F 12/79; G06F 12/1483
(Continued)

(56) References Cited

U.S. PATENT DOCUMENTS 6,449,683 B1  9/2002  Silvester
6,769,050 B1*  7/2004  Ware ................... G06F 13/1684
                                                    711/149
(Continued)

FOREIGN PATENT DOCUMENTS

KR  20110132202  12/2011

OTHER PUBLICATIONS

PCT; "Notification of Transmittal of the International Search Report and the Written Opinion of the International Searching Authoirty, or the Declaration,"; cited in PCT/US2013/034385; dated Jan. 8, 2014; 9 pages.
(Continued)

*Primary Examiner* — Mohamed M Gebril
(74) *Attorney, Agent, or Firm* — International IP Law Group, PLLC

(57) ABSTRACT

A system and method for addressing split modes of persistent memory are described herein. The system includes a non-volatile memory comprising regions of memory, each region comprising a range of memory address spaces. The system also includes a memory controller (MC) to control access to the non-volatile memory. The system further includes a device to track a mode of each region of memory and to define the mode of each region of memory. The mode is a functional use model.

15 Claims, 4 Drawing Sheets

(51) Int. Cl.
*G06F 12/0815* (2016.01)
*G06F 12/14* (2006.01)
*G06F 12/02* (2006.01)
*G06F 21/79* (2013.01)

(52) U.S. Cl.
CPC ...... *G06F 21/79* (2013.01); *G06F 2212/1052* (2013.01); *G06F 2212/7201* (2013.01)

(58) Field of Classification Search
USPC .......................................................... 711/163
See application file for complete search history.

(56) References Cited

U.S. PATENT DOCUMENTS

| | | | |
|---|---|---|---|
| 7,944,729 B2 | 5/2011 | Chen et al. | |
| 8,260,886 B2* | 9/2012 | Kling | H04L 63/101 |
| | | | 709/220 |
| 8,930,647 B1* | 1/2015 | Smith | G06F 30/392 |
| | | | 711/154 |
| 2007/0030733 A1* | 2/2007 | Shen | G11C 29/76 |
| | | | 365/185.09 |
| 2007/0101158 A1 | 5/2007 | Elliott | |
| 2008/0046997 A1* | 2/2008 | Wang | G06F 21/80 |
| | | | 726/16 |
| 2008/0222371 A1 | 9/2008 | Caulkins | |
| 2008/0301256 A1 | 12/2008 | McWilliams et al. | |
| 2009/0003034 A1* | 1/2009 | Happ | G11C 11/005 |
| | | | 365/148 |
| 2010/0005317 A1 | 1/2010 | Pribadi et al. | |
| 2010/0191779 A1 | 7/2010 | Hinrichs | |
| 2011/0066790 A1 | 3/2011 | Mogul et al. | |
| 2011/0082992 A1 | 4/2011 | Fineberg et al. | |
| 2011/0161597 A1* | 6/2011 | Tremaine | G06F 12/0895 |
| | | | 711/133 |
| 2011/0320910 A1* | 12/2011 | Liu | G06F 11/10 |
| | | | 714/758 |
| 2012/0005459 A1 | 1/2012 | Fleischman et al. | |
| 2012/0075905 A1* | 3/2012 | Iwanari | G11C 7/08 |
| | | | 365/145 |
| 2012/0284453 A1 | 11/2012 | Hashimoto | |
| 2013/0159663 A1* | 6/2013 | Levenglick | G06F 12/1491 |
| | | | 711/206 |
| 2014/0181365 A1* | 6/2014 | Fanning | G06F 3/0604 |
| | | | 711/103 |
| 2014/0181367 A1* | 6/2014 | Gries | G06F 9/5061 |
| | | | 711/103 |
| 2014/0226413 A1* | 8/2014 | Gomez | G11C 16/3454 |
| | | | 365/185.22 |
| 2016/0291869 A1* | 10/2016 | Yi | G06F 3/061 |

OTHER PUBLICATIONS

Sherbak, T., "Simplifying Management Through Windows Storage Consolidation on Dell Powervault Nx3000 NAS Appliances," (Research Paper), Reprinted from Dell Power Solutions, 2010, Issue 1, 5 pages.

* cited by examiner

SPLIT MODE ADDRESSING A PERSISTENT MEMORY

CROSS-REFERENCE TO RELATED APPLICATION

This application is a United States National Stage Application of International Patent Application No. PCT/US2013/034385, filed on Mar. 28, 2013, the contents of which are incorporated by reference as if set forth in their entirety herein.

BACKGROUND

In a computing architecture, a memory hierarchy organizes types of storage, such as processor registers, caches, main memory, disk storage, tertiary storage, and other types of storage in the computing architecture, by performance, i.e., response time. Each of the levels of the memory hierarchy meets different expectations for data persistence, protection, and accessibility. These attributes are provided by the software that accesses the data, as well as by the devices and the controllers associated with the memory hierarchy level, and are assumed by the software applications that make use of the hierarchy.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
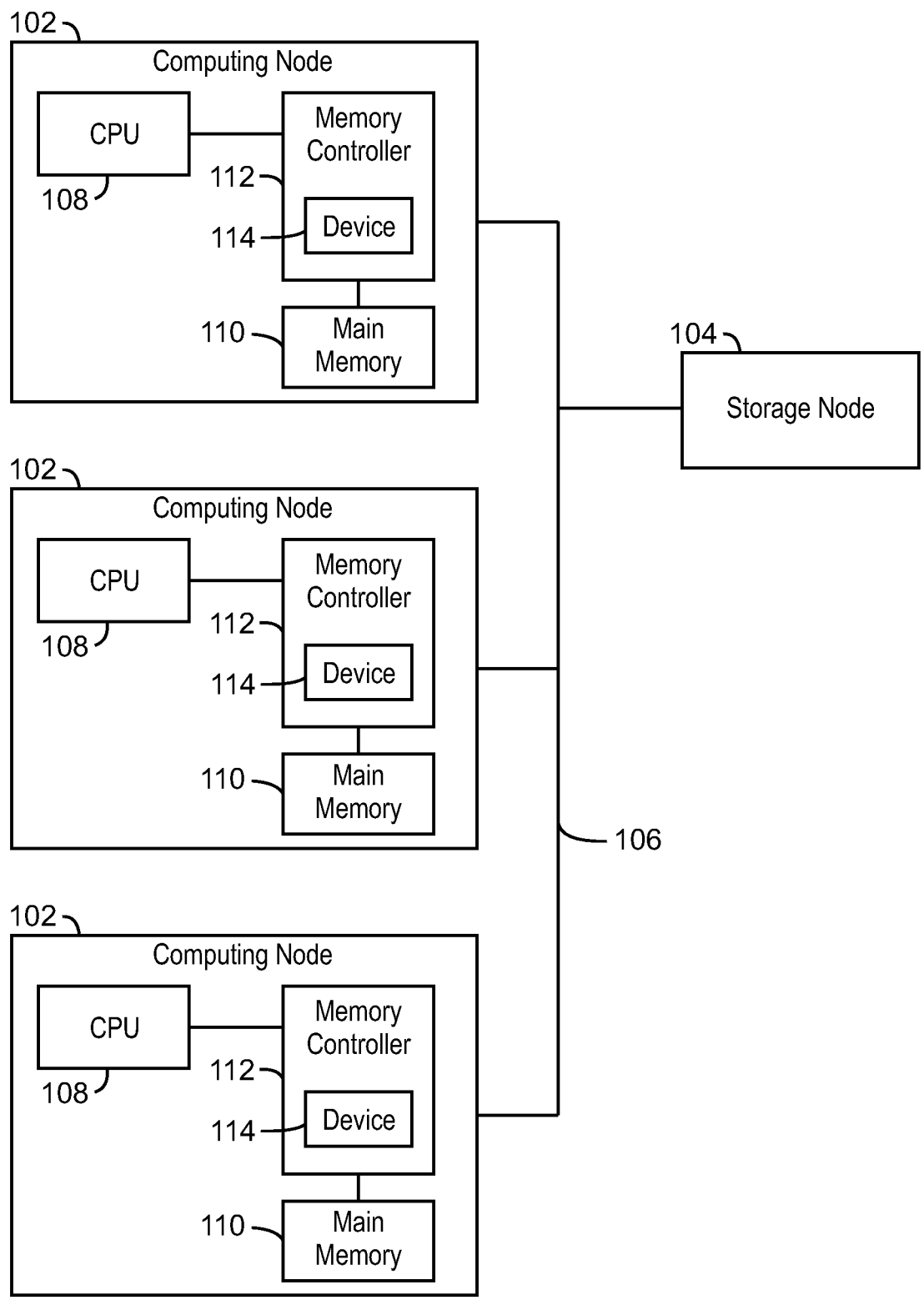
FIG. 1 is a block diagram of an example of a computing system.

The techniques described herein relate generally to techniques for addressing persistent memory. More specifically, techniques described herein relate to split modes of persistent memory. Current computing system designs provide separate components for memory, such as internal memory, main memory, on-line mass storage, and off-line bulk storage, each component forming a level of memory hierarchy. For example, DRAM, Flash SSD, or spinning disks provide local storage, i.e., storage physically located on a computing node or device, and fabric or network-attached disk arrays provide shared storage, i.e. storage accessible by multiple computing nodes or devices connected to the network.

Historically, memory technologies suitable for storing data, i.e., lower cost and very high capacity, have been too slow, and for some too prone to wear out, to function well as a computer system's main memory. In addition, extra features such as storage redundancy for reliability and data encryption to provide data security have been implemented in storage controllers, where the latency cost of these operations is largely hidden by slower, non-volatile memory technologies.

New solid state persistent memory devices with densities like Flash memories and access times like DRAM memories allow the design of computing systems that flatten the memory hierarchy. With these fast, dense, persistent memory devices, shared storage, local storage, and working data sets kept traditionally in DRAM can all be consolidated. Response time is greatly improved to access large data capacities within these devices, improving overall system performance. Storage functions, such as redundant data storage (e.g., mirroring or RAID), and data encryption still add complexity and delay, relative to a main-memory access model.

New solid-state, persistent, dense, fast memory devices allow for the consolidation of shared storage, local storage, and working set memory into a common pool of memory devices accessed through a common system memory interface or interfaces. Working-set memory is memory storing working-set data, i.e., pages currently in use by a process. While the interface is common, the usage models for the memory will vary according to the design of a particular system, and the software paradigms employed. For instance, memory used to hold working set data does not need persistence and is accessed with simple cache line reads and writes. Memory used as local storage may use additional mechanisms to ensure that the data is removed from caches when a memory page or block is committed to permanent storage, or when access to the data is revoked by the operating system. In other cases, data redundancy may be used in ranges of memory used as storage to guard against data loss in the event of device errors or power failure. Data encryption can be used in ranges of memory to protect against unauthorized access of data.

A device and method for tracking ranges of memory addresses, or regions of memory, assigned to each type of usage model is addressed herein. The device tracks the mode, the functional use model, of each region of memory and defines the mode of each region of memory. The device can also track the attributes and access rules, if any, of each region of memory. In an example, the device manages access privileges to a region of memory for remote access. The device may additionally translate a physical address presented by a processor core into an access address presented to the memory devices. The device can further deny access to a range of memory when access rules defined for the range of memory are not met. In an example, the device can define the access rules for a range of memory.

The device and method enable processors to take full advantage of dense, fast memory for better performance. In addition, security of the data stored in the dense, fast memory is maintained by providing independent management interfaces to configure the memory to create the virtual hardware seen by the operating system or hypervisor. Additionally, with the features of the device and method disclosed herein, a large pool of fast, persistent memory can be flexibly allocated to provide working memory, memory-mapped storage, and/or disk storage, each with the attributes chosen to best meet the purpose for which that range of persistent memory is intended to serve. As configuration is provided to guide the hardware, software overhead is minimized, and software-stack compatibility issues are minimized and localized. Additionally, hardware overheads contributing to slower access, such as managing redundant data, can be avoided for use cases that do not require particular features.

Further, in current computing system designs, in order to support different use cases, new circuit boards, such as physical field replaceable units (FRUs), are installed in a computing system. By supporting different use cases through simple differences in configuration, many different system requirements can be supported using fewer physical field replaceable units (FRUs). The FRUs can be reallocated and reconfigured to address new system requirements. Additionally, a smaller number of device stock-keeping units (SKUs) can be designed, offered, and deployed, which can still serve the role of today's multiple SKUs of memory boards, disk drives, solid-state drives, etc. Further, consolidation of memory hierarchy into fewer levels will reduce overall system complexity, power, and cost.

FIG. 1 is a block diagram of an example of a computing system, such as a data center. The computing system 100 includes a number of nodes, such as computing node 102 and storage node 104. The nodes 102 and 104 are communicably coupled to each other through a network 106, such as a data center fabric. The computing system 100 can include several compute nodes, such as several tens or even thousands of compute nodes.

The compute nodes 102 include a Central Processing Unit (CPU) 108 to execute stored instructions. The CPU 108 can be a single core processor, a multi-core processor, or any other suitable processor. In an example, compute node 102 includes a single CPU. In another example, compute node 102 includes multiple CPUs, such as two CPUs, three CPUs, or more.

The compute node 102 includes a main memory 110. In an example, the main memory 110 is non-volatile memory, such as volatile dynamic random access memory (DRAM), non-volatile phase change random access memory (PCRAM), spin transfer torque-magnetoresistive random access memory (STT-MRAM), resistive random access memory (reRAM), memristor, FLASH, or other types of memory devices. For example, the main memory 110 is solid state, persistent, dense, fast memory. Fast memory can be memory having an access time similar to DRAM memory. In a further example, the main memory 110 consolidates shared storage and local storage. In an example, each node of the computing system 100 can access the main memory 110 of the other nodes of the computing system 100, resulting in a large pool of shared memory.

Compute node 102 further includes a memory controller 112. The memory controller 112 controls access to the main memory 110, such as persistent memory, by the CPU 108. Persistent memory is non-volatile storage, which will maintain stored data even when power is removed, and for long periods of time without requiring refresh operations.

Memory controller 112 includes device 114 for tracking and defining regions of memory of the computing system 100, such as by defining regions of memory of the computing node 102. The device 114 tracks and defines the modes (the functional use models) of the regions of memory. The regions of memory can be ranges of memory address spaces. In an example, device 114 is an address mapping table. In another example, device 114 defines various features of each region of memory.

Computing system 100 also includes storage node 104. Storage node 104 is a collection of storage, such as a collection of storage devices, for storing a large amount of data. In an example, storage node 104 is used to backup data for computing system 100. In an example, storage node 104 is an array of storage or memory devices. In an example, computing device 100 includes a single storage node 104. In another example, computing device 100 includes multiple storage nodes 104. In an example, storage node 104 also includes a device 114 (not shown) for defining regions of memory of the storage node 104.

The block diagram of FIG. 1 is not intended to indicate that the computing system 100 is to include all of the components shown in FIG. 1. Further, the computing system 100 may include any number of additional components not shown in FIG. 1, depending on the details of the specific implementation.

Figure 2:
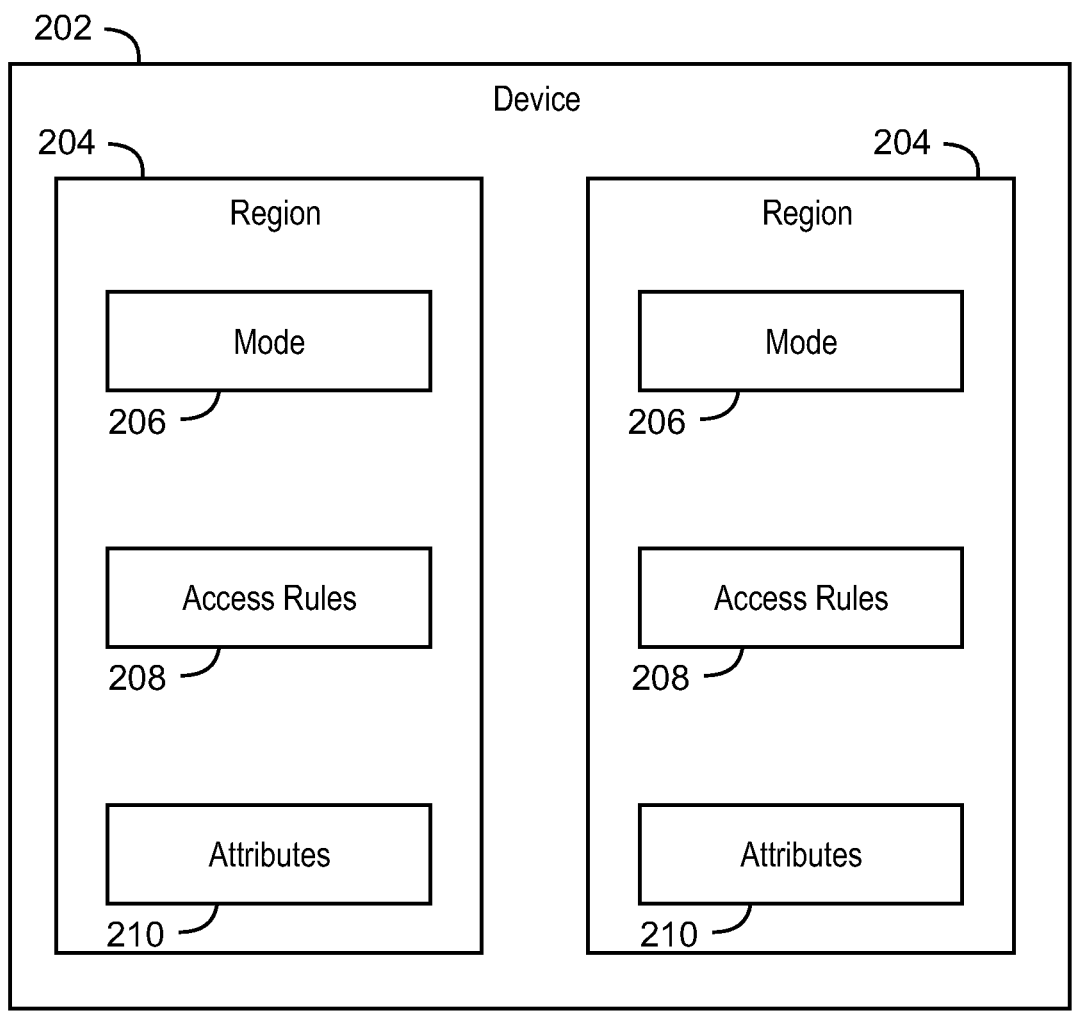
FIG. 2 is a block diagram of an example of a device for defining regions of memory of a computing system.

FIG. 2 is a block diagram of an example of a device 202 for defining regions 204 of memory of a computing system, such as computing system 100. Device 202 tracks and defines characteristics of each region of memory, including the mode (functional use model) of each region, the attributes of each region, and the access rules of each region. In an example, device 202 is an address mapping table. The device 202 can reside in a memory controller, such as memory controller 112. In an example, the memory controller is a memory controller for persistent memory. The device 202 can also translate a local address presented by a processor into a memory access address presented to the memory devices.

The device 202 can define multiple regions 204 of memory. Each region 204 is a range of memory address spaces. For example, each region 204 can be a range of consecutive memory address spaces. Each region 204 can vary in size, i.e. in the number of memory address spaces included in the region 204.

Each region 204 has a defined mode 206. Each mode 206 is a functional use model/memory usage model, i.e. how the region of memory acts. For example, mode 206 can be working-set memory, memory mapped storage with encryption, memory mapped storage without encryption, encrypted storage, reflective memory, block storage, redundant storage, any other suitable type of mode of operation, or a combination thereof. In an example, each region 204 of the memory is defined as a different mode 206.

Device 202 can further include switches (not shown). Device 202 configures the switches to govern which action is taken by the memory controller for memory addresses in the matching range. The switches indicate behaviors or actions that implement a given mode. A combination of switches, set or not set, can define each mode. For example, a switch, or set of switches, can be set to indicate encryption. Encrypted storage mode can use recall of cache lines from processor caches and commitment of the cache lines to the memory. Data can be encrypted as it is written or decrypted as it is read. Switches can be set to indicate "enable recall of cache lines" and "encryption on". In another example, a switch(es) can indicate RAID enablement. For example, the non-volatile memory can be used as unencrypted, block accessed, mirrored storage. In this example, a switch for "enable recall of cache lines" can be set, and a switch for "encryption on" can be not set. Additionally, block access and mirroring switches can be set.

By providing for switches within the device 202, a variety of modes 206, or memory usage models, can be supported. While given combinations of switch settings will correspond to known use cases (i.e., modes 206), other combinations of switch settings may enable as-yet-unidentified new use cases.

In addition, the device 202 can define how accesses to each region 204 should be processed. For example, the device 202 can define access rules 208 of each region 204. The device 202 can disallow an access that attempts to read or write a given portion of the memory pool with the wrong usage paradigm. The device 202 can disallow an access that originates from a source that does not meet the access rules 208. For example, access can be disallowed when the access originates from a source that has not been enabled, i.e., a source that has not been approved for access to a region 204.

In an example, no access rules 208 are included in region 204 and access to region 204 is thus not restricted.

The device 202 can also define the attributes 210 of each region 204. Examples of attributes 210 include, in an encrypted region, the encryption standard for the region 204. Attributes 210 can also include an indication regarding whether the region 204 is RAIDed and, if the region 204 is RAIDed, which type of RAIDing is used and where to find RAID volumes. Attributes 210 can further include an indication of the presence, or lack thereof, of redundancy in the mode of region 204.

In an example, mode 206 can be working-set memory. Working-set memory does not rely on persistency, but is instead reloaded, or recalculated, in the event of a system reboot. This is a memory implemented in DRAM in today's systems, or possible held in swap space in storage. However, a region 204 of the persistent memory used as working-set memory is accessed with normal reads and writes. Given the persistence of data in this memory, in-line encryption and decryption might additionally be enabled to guard against the scenario in which the physical memory devices are removed and an attempt is made to examine the data in them.

In another example, mode 206 can be memory-mapped storage (MMS). MMS provides mechanics to allow direct access to storage residing in the configured portion of the persistent memory pool. MMS defines specific protocols for the controller to implement to provide the expected behaviors. Access to address ranges configured as an MMS region can trigger the memory controller to follow these protocols. In part, MMS data management includes the maintenance of a meta-data. By providing for split allocation of persistent memory, portions of the memory pool not configured to be used as MMS do not need to include these overheads. MMS mode can include encryption, or not include encryption. If the MMS mode includes encryption, failure to access the MMS mode region using the proper encryption key will result in access to the MMS mode region being denied, or unusable data being returned.

Device 202 can include legacy compatibility with software. For example, current software may expect a memory hierarchy that includes working-set memory and disk storage, but not memory-mapped storage (MMS). To provide legacy compatibility with this software, a portion of the memory pool may be configured to appear as separate disk storage. For this mode, the memory controller (MC) can include the capability to transfer blocks of data between disk regions and working-set memory regions of the memory pool. The transfer of blocks between regions can be managed through a new software driver, or the memory controller can provide an interface that existing drivers already recognize. These data block transfers effectively access both the "disk" and "working-set" portions of the device 202 to execute the transfers. Transfers which provide addresses that do not match the expected memory types as defined in the address mapping table return with an error. In some embodiments, an effective transfer of data can be achieved without actually moving the data blocks. For example, a working-region of memory can be re-assigned to a disk region of memory, which creates the appearance that data has been moved from the working set to a disk.

In an example, the transfer of blocks of data is a direct memory access (DMA) transfer. A new DMA driver can manage the transfer of blocks of data between regions, or the memory controller can provide a DMA interface that existing drivers already recognize.

Memory regions configured to be reflective can also be indicated through device 202. Reflective memory mode will trigger a second copy of each write to regions of memory enabled for reflection to be sent through cluster fabric. The copy will be sent to a target node where the node's memory will be updated. The local memory (i.e., the memory closer to the node) can also be updated.

The computing system can also configure regions 204 of the pooled memory, designated as critical regions, to use redundant storage to protect the data from device failure. Regions 204 configured to use redundant storage are configured to enact redundancy operations, such as mirroring the data or RAIDing of the data to remote storage. Regions 204 not designated as critical do not initiate redundancy operations.

To provide for the "far end" of data redundancy or reflective memory transactions, remote requests for access to the local memory pool can be required. The device 202 can also provide the appropriate configurations for how to handle these remote-initiated accesses, including checking that the source of the transaction is authorized to access the targeted region 204.

When a memory controller, such as memory controller 112, receives an inbound request to access memory, the memory controller queries the device 202 to check the memory address against the device 202 to determine which portion (i.e., region 204) of memory it is accessing, and how the access should be processed by the memory controller. In this way, a common pool of memory in the computing system is segregated into separate functional use models.

Figure 3:
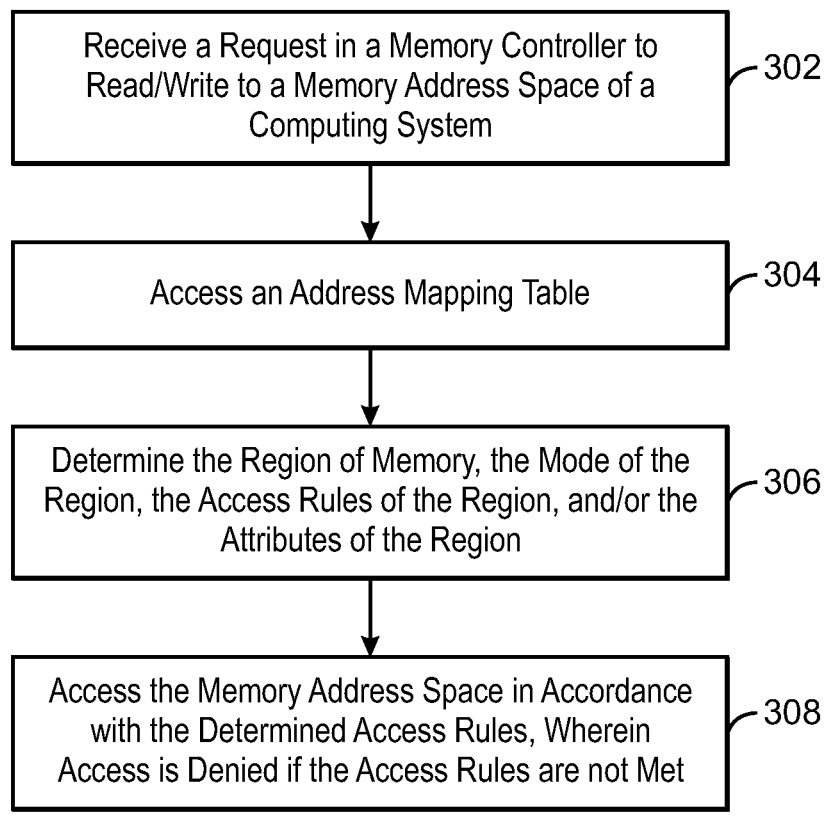
FIG. 3 is a process flow diagram illustrating an example of a method of accessing a region of memory of a computing system.

FIG. 3 is a process flow diagram illustrating an example of a method 300 of accessing a region of memory of a computing system, such as computing system 100. At block 302, a request is received in a memory controller to read/write to a memory address space of a computing system. In an example, the request is received from a processor, such as processor 108.

At block 304, the memory controller accesses a device, such as device 202. In an example, the device is a memory mapping table. The can reside in the memory controller. The device defines attributes of the memory address space. For example, the device can define the region of memory in which the memory address space resides. The device can also track and define the mode of the region of memory, as well as the access rules of the region. The device can further define the attributes of the region of memory.

At block 306, the region of memory, the mode of the region, the access rules of the regions, and/or the attributes of the region are determined. At block 308, the memory address space is accessed in accordance with the determined access rules. Access is denied, such as by the device, if the access rules are not met. In an example, no access rules are listed in the address mapping table and access to the region of memory is not restricted.

It is to be understood that the process flow diagram of FIG. 3 is not intended to indicate that the steps of the method 300 are to be executed in any particular order, or that all of the steps of the method 300 are to be included in every case. Further, any number of additional steps not shown in FIG. 3 may be included within the method 300, depending on the details of the specific implementation.

Figure 4:
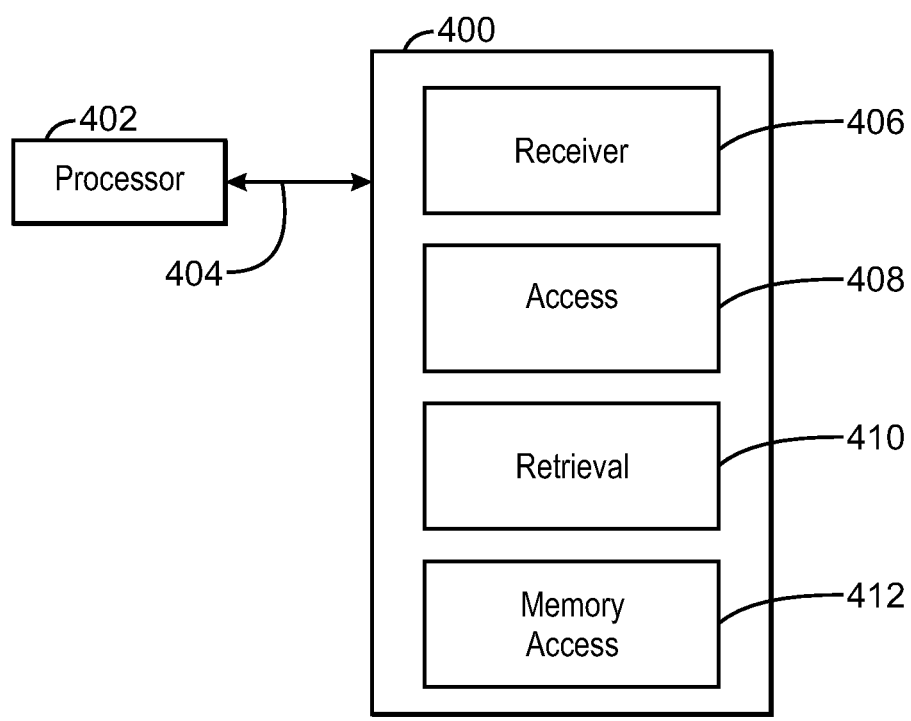
FIG. 4 is a block diagram of a tangible, non-transitory, computer-readable storage medium containing code for accessing regions of non-volatile memory.

FIG. 4 is a block diagram of a tangible, non-transitory, computer-readable storage medium containing code for accessing regions of non-volatile memory. The tangible, non-transitory, computer-readable storage medium is referred to by the reference number 400. The tangible, non-transitory, computer-readable storage medium 400 can comprise RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory, computer-readable storage medium 400 may be accessed by a processor 402 over a computer bus 404. Furthermore, the tangible, non-transitory, computer-readable storage medium 400 may include code configured to direct a processor to perform the methods described herein.

As shown in FIG. 4, the various components discussed herein can be stored on the non-transitory, computer-readable storage medium 400. A first region 406 on the tangible, non-transitory, computer-readable medium 400 can include a receiver module for receiving a request to access a region of memory of a computing system. A region 408 can include an access module to access a device defining a mode of the region of memory. A region 410 can include a retrieval module to retrieve access rules of the region of memory defined by the device. A region 412 can include a memory access module to access the region of memory in accordance with the access rules defined by the device. Although shown as contiguous blocks, the software components can be stored in any order or configuration. For example, if the tangible, non-transitory, computer-readable storage medium 400 is a hard drive, the software components can be stored in non-contiguous, or even overlapping, sectors.

Example 1

A computing system is described herein. The computing system includes a non-volatile memory including regions of memory, each region including a range of memory address spaces. The computing system also includes a memory controller (MC) to control access to the non-volatile memory. The computing system further includes a device to track a mode of each region of memory and to define the mode of each region of memory. The mode is a functional use model.

The device can be an address mapping table. The device can be within the memory controller. The device can define how access to each region is processed by a memory controller. The mode of each region of data can be defined as one of working-set memory, memory mapped storage with encryption, memory mapped storage without encryption, encrypted storage, reflective memory, block storage, disk storage, redundant storage, or a combination thereof. The device can deny access to a region of memory when access rules defined by the device are not met. The device can define attributes of each region of memory. The device can configure switches in the device to control actions to be taken by the memory controller for each region.

Example 2

A method is described herein. The method includes receiving a request to access a region of memory of a computing system in a memory controller. The method also includes accessing a device defining a mode of the region of memory and receiving access rules of the region of memory defined by the device. The method further includes accessing the region of memory in accordance with the access rules defined by the device.

The device can reside in a memory controller. The method can further include receiving a notice of access denial from the device when the access rules defined by the device are not met. The device can define the mode of the region of memory as one of working-set memory, memory mapped storage with encryption, memory mapped storage without encryption, encrypted storage, reflective memory, block storage, disk storage, redundant storage, or a combination thereof. The device can define attributes of the region. Accessing the region of memory can include reading, writing, or reading and writing to the region of memory. Each region of memory can include a range of memory address spaces.

Example 3

A tangible, non-transitory, computer-readable storage medium including code is described herein. The code directs a processor to receive a request to access a region of memory of a computing system in a memory controller. The code also directs a processor to access a device defining a mode of the region of memory and to receive access rules of the region of memory defined by the device. The code further directs a processor to access the region of memory in accordance with the access rules defined by the device.

The region of memory can include a range of memory addresses. Access to a region of memory can be denied when access rules defined by the device for the region or memory are not met. The mode of each region of memory can be one of working-set memory, memory mapped storage with encryption, memory mapped storage without encryption, reflective memory, block storage, disk storage, redundant storage, or a combination thereof.

The present examples may be susceptible to various modifications and alternative forms and have been shown only for illustrative purposes. For example, the present techniques support both reading and writing operations to a device cache. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A computing system, comprising:
a non-volatile memory comprising regions of memory, each region comprising a range of memory address spaces;
a memory controller (MC) to control access to the non-volatile memory; and
a device to track a mode of each region of memory and to define the mode of each region of memory, wherein the mode is a functional use model,
wherein the mode of a first region of memory is a non-persistent memory, exposing the first region as dynamic random-access memory (DRAM),
wherein the mode of a second region of memory is a persistent memory exposing the second region as a separate disk storage,
and wherein the memory controller is to:
receive a request to access the non-volatile memory, the request specifying an address and in accordance with a usage mode;
determine a region of memory of the non-volatile memory to which the request pertains by the specified address;
determine whether the usage mode of the request is identical to a usage mode of the region of memory to which the request pertains, the usage mode of the region of memory being one of the non-persistent memory such that the region of memory is exposed as the DRAM, and persistent memory such that the region of memory is exposed as the separate disk storage;
permit access to the non-volatile memory at the specified address responsive to determining that the usage mode of the request is identical to the usage mode of the region of memory to which the request pertains; and
deny access to the non-volatile memory at the specified address responsive to determining that the usage mode of the request is not identical to the usage mode of the region of memory to which the request pertains.

2. The computing system of claim 1, wherein the device comprises an address mapping table.

3. The computing system of claim 1, wherein the device is within the memory controller.

4. The computing system of claim 1, wherein the mode of each region of memory is defined as one of working-set memory, memory mapped storage with encryption, memory mapped storage without encryption, encrypted storage, reflective memory, block storage, disk storage, redundant storage, or a combination thereof.

5. The computing system of claim 1, wherein the device denies access to a region of memory when access rules defined by the device are not met.

6. The computing system of claim 1, wherein the device configures switches in the device to control actions to be taken by the memory controller for each region.

7. A method, comprising:
receiving a request to access a region of a plurality of regions of memory of a computing system in a memory controller, each region having a mode;
accessing a device defining the mode of the region of memory;
receiving access rules of the region of memory defined by the device;
accessing the region of memory in accordance with the access rules defined by the device,
wherein the mode of a first region of memory is a non-persistent memory exposing the first region as dynamic random-access memory (DRAM),
wherein the mode of a second region of memory is a persistent memory exposing the second region as a separate disk storage,
wherein the request is to access one of the first region and the second region;
receiving a request to access the non-volatile memory, the request specifying an address and in accordance with a usage mode;
determining a region of memory of the memory to which the request pertains by the specified address;
determining whether the usage mode of the request is identical to a usage mode of the region of memory to which the request pertains;
permitting access to the non-volatile memory at the specified address responsive to determining that the usage mode of the request is identical to the usage mode of the region of memory to which the request pertains, the usage mode of the region of memory being one of the non-persistent memory such that the region of memory is exposed as the DRAM, and persistent memory such that the region of memory is exposed as the separate disk storage; and
denying access to the non-volatile memory at the specified address responsive to determining that the usage mode of the request is not identical to the usage mode of the region of memory to which the request pertains.

8. The method of claim 7, wherein the device defining the mode of the region of memory comprises an address mapping table.

9. The method of claim 7, wherein the device resides in the memory controller.

10. The method of claim 7, further comprising receiving a notice of access denial from the device when the access rules defined by the device are not met.

11. The method of claim 7, wherein the device defines the mode of the region of memory as one of working-set memory, memory mapped storage with encryption, memory mapped storage without encryption, encrypted storage, reflective memory, block storage, disk storage, redundant storage, or a combination thereof.

12. A tangible, non-transitory, computer-readable storage medium comprising code to direct a processor to:
receive a request to access a region of a plurality of regions of memory of a computing system in a memory controller, each region having a mode;
access a device defining the mode of the region of memory;
receive access rules of the region of memory defined by the device;
access the region of memory in accordance with the access rules defined by the device,
wherein the mode of a first region of memory is a non-persistent memory exposing the first region as dynamic random-access memory (DRAM),
wherein the mode of a second region of memory is a persistent memory exposing the second region as a separate disk storage,
wherein the request is to access one of the first region and the second region;
receive a request to access the non-volatile memory, the request specifying an address and in accordance with a usage mode;
determine a region of memory of the computing system to which the request pertains by the specified address;
determine whether the usage mode of the request is identical to a usage mode of the region of memory to which the request pertains;
permit access to the non-volatile memory at the specified address responsive to determining that the usage mode of the request is identical to the usage mode of the region of memory to which the request pertains, the usage mode of the region of memory being one of the non-persistent memory such that the region of memory is exposed as the DRAM, and persistent memory such that the region of memory is exposed as the separate disk storage; and
deny access to the non-volatile memory at the specified address responsive to determining that the usage mode of the request is not identical to the usage mode of the region of memory to which the request pertains.

13. The tangible, non-transitory, computer-readable storage medium of claim 12, wherein the region of memory comprises a range of memory addresses.

14. The tangible, non-transitory, computer-readable storage medium of claim 12, wherein access to a particular region of memory is denied when access rules defined by the device for the particular region of memory are not met.

15. The tangible, non-transitory, computer-readable storage medium of claim 12, wherein the mode of each region of memory is one of working-set memory, memory mapped storage with encryption, memory mapped storage without encryption, reflective memory, block storage, disk storage, redundant storage, or a combination thereof.

* * * * *